US010397705B2

(12) United States Patent
Egger et al.

(10) Patent No.: US 10,397,705 B2
(45) Date of Patent: Aug. 27, 2019

(54) MULTI-LAYER COMPOSITE FOR ACOUSTIC MEMBRANES

(71) Applicant: tesa SE, Norderstedt (DE)

(72) Inventors: Michael Egger, Hamburg (DE); Gero Maatz, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 15/534,802

(22) PCT Filed: Nov. 17, 2015

(86) PCT No.: PCT/EP2015/076817
§ 371 (c)(1),
(2) Date: Jun. 9, 2017

(87) PCT Pub. No.: WO2016/091542
PCT Pub. Date: Jun. 16, 2016

(65) Prior Publication Data
US 2018/0270577 A1 Sep. 20, 2018

(30) Foreign Application Priority Data
Dec. 11, 2014 (DE) .................. 10 2014 225 579

(51) Int. Cl.
| H04R 7/10 | (2006.01) |
| H04R 7/06 | (2006.01) |
| B32B 7/12 | (2006.01) |
| H04R 7/02 | (2006.01) |
| B32B 27/08 | (2006.01) |
| B32B 27/28 | (2006.01) |
| B32B 27/32 | (2006.01) |
| B32B 27/40 | (2006.01) |

(52) U.S. Cl.
CPC ............. *H04R 7/10* (2013.01); *B32B 7/12* (2013.01); *B32B 27/08* (2013.01); *B32B 27/285* (2013.01); *B32B 27/286* (2013.01); *B32B 27/288* (2013.01); *B32B 27/32* (2013.01); *B32B 27/40* (2013.01); *H04R 7/02* (2013.01); *H04R 7/06* (2013.01); *B32B 2250/24* (2013.01); *B32B 2255/10* (2013.01); *B32B 2255/26* (2013.01); *B32B 2307/10* (2013.01); *B32B 2307/546* (2013.01); *B32B 2307/56* (2013.01); *B32B 2307/732* (2013.01); *B32B 2307/738* (2013.01); *B32B 2457/00* (2013.01); *F16C 2208/52* (2013.01); *H04R 2307/025* (2013.01); *H04R 2499/11* (2013.01)

(58) Field of Classification Search
CPC ...... H04R 7/06; H04R 7/10; H04R 2307/025; B32B 7/12; B32B 27/08; B32B 27/286; B32B 2307/10; B32B 2307/738; B29K 2081/04; B29K 2281/04; B29K 2481/04; B29K 2681/04; B29K 2881/04; F16C 2208/52
USPC .................................. 181/167, 170; 381/426
See application file for complete search history.

(56) References Cited

U.S. PATENT DOCUMENTS

| 4,910,294 | A | 3/1990 | Ogata et al. | |
| 5,162,619 | A * | 11/1992 | Thiele .................. | H04R 7/10 181/166 |
| 5,688,908 | A | 11/1997 | Haubs et al. | |
| 7,726,441 | B2 | 6/2010 | Uryu et al. | |
| 8,189,851 | B2 | 5/2012 | Booth et al. | |
| 2009/0234068 | A1 | 9/2009 | Horiuchi et al. | |
| 2013/0069001 | A1 | 3/2013 | Luo et al. | |
| 2014/0178662 | A1* | 6/2014 | Luo .................... | B32B 5/12 428/220 |
| 2014/0210309 | A1* | 7/2014 | Miyoshi ............... | H04R 7/04 310/313 A |
| 2015/0125692 | A1 | 5/2015 | Muessig et al. | |
| 2016/0052246 | A1 | 2/2016 | Egger et al. | |
| 2017/0188155 | A1* | 6/2017 | Liu .................... | H04R 7/06 |

FOREIGN PATENT DOCUMENTS

| EP | 0737705 A2 | 10/1996 |
| JP | 2010070656 A | 4/2010 |
| WO | 2013/174609 A1 | 11/2013 |
| WO | 2014/099189 A1 | 6/2014 |
| WO | 2014/170122 A1 | 10/2014 |

OTHER PUBLICATIONS

Luo, Rong, et al.; "Halogen-Free Polyphenylene Sulfide for Consumer Electronics Applications"; Celanese; Sep. 19, 2013; pp. 1-5; Florence, Kentucky, United States of America.
International Search Report for International Application No. PCT/EP2015/076817 dated Feb. 3, 2016.
Results of Feb. 18, 2018 Examination issued by the Korean Patent Office corresponding to Korean Application No. 10-2017-7018653.
English Translation of Japanese Office Action corresponds to Japanese Application No. 2017-531151 dated Jul. 26, 2018.

* cited by examiner

Primary Examiner — Jesse A Elbin
(74) Attorney, Agent, or Firm — Norris McLaughlin, P.A.

(57) ABSTRACT

Multi-layer composites and methods of using the composites as a membrane for electroacoustic transducers. The composites and methods comprise at least one first and one second outer layer, wherein at least one of the cover layers being made from a polypropylene sulfide-plastic having a halogen content not exceeding 550 ppm.

10 Claims, No Drawings

MULTI-LAYER COMPOSITE FOR ACOUSTIC MEMBRANES

This application is a 371 application of PCT/EP2015/076817 filed Nov. 17, 2015, which claims foreign priority benefit under 35 U.S.C. § 119 of German Application No. DE 10 2014 225 579.1 filed Dec. 11, 2014.

The invention relates to a multi-layer composite comprising at least one outer polyphenylene sulfide film for use as membrane for electroacoustic transducers.

Sound generation in cell phones and smart phones for the purpose of reproducing speech, ringtones, music, etc. is effected via small electroacoustic transducers known as microspeakers. Microspeakers of this type, which are also used in headphones, Notebooks, LCD television sets or Personal Digital Assistants (PDAs), typically have membranes from 20 mm² to 900 mm² in size.

Since microspeakers are becoming ever smaller and flatter in line with the design requirements of the corresponding electronic devices, but are additionally supposed to be capable of operating to a higher power output, heat exposure of the microspeaker and especially of its membrane is on the up and up. At the same time, the acoustical properties of the speakers are also expected to meet ever higher requirements since in smart phones, for example, they are also being increasingly used for loud playback of music, for which they should also have a good quality of sound. The expectations of the mechanical endurance and acoustical merit of a microspeaker membrane have risen enormously in recent years as a result.

A speaker membrane should generally be very stiff and light, in order to generate a high sonic pressure and cover a wide range of frequencies, yet at the same time also be highly damped, in order to display a very smooth frequency response characteristic. Since the properties of stiff, light and well-damped result in a design contradiction in that they cannot all be achieved at one and the same time (the higher the stiffness, the lower the damping, and vice versa), it is generally necessary with every membrane to compromise between the stiffness and the damping of the membrane material or to combine stiff materials with efficiently damping materials. Multi-layer composites (especially multilayered laminates) are therefore frequently used and then formed into the membrane. These multi-layer composites generally combine layers that stiffen/stabilize the membrane with layers that dampen the membrane. The stiff films used in the multi-layer composites currently available on the market make in themselves a but minimal contribution to damping.

Thus, U.S. Pat. No. 7,726,441 B describes a membrane comprising a multi-layer composite combining two stiff polymeric films with a damping layer of adhesive between these films. U.S. Pat. No. 8,189,851 B describes the use of soft pressure-sensitive adhesives as damping layers in multi-layer composites and specifies a metric for the damping of the overall multilayered membrane construction in the mechanical loss factor (tangent delta; tan δ) on the basis of the elastic modulus E (Young's modulus). It is defined as the ratio of loss modulus E" to storage modulus E': tan δ=E"/E' and is stated to have a minimum value in a relevant frequency interval.

Prior art polymeric film material for stiff polymeric films (outer layers of the membrane) include inter alia polyphenylene sulfide plastics (the code PPS is also customary for polyphenylene sulfide and is used herein). (Micro)speakers whose membranes are made with PPS as outer layer material, however, have typically unsatisfactory acoustic distortions, resulting in tonal impairment of the acoustic signals. Total harmonic distortion (THD) quantifies the nonlinear distortion of the speaker and is simple to determine for the speaker.

THD is defined as the ratio of the summed power outputs $P_h$ of all higher harmonics to the power output of the fundamental harmonic $P_1$ and is usually reported in percent:

$$\text{THD }[\%] = (P_h/P_1)*100$$

Plastics used as outer film material to realize optimized acoustic properties for speaker membranes, examples being polyetherimide (PEI), polyarylate (PAR) or polyetheretherketone (PEEK), are appreciably costlier than PPS.

The production of PPS, including for such films as are used for membranes of the afore-mentioned type typically takes the form of a polycondensation process from phenylene dihalides, especially dichlorobenzene, and sodium sulfide in a high-boiling dipolar aprotic solvent such as, for example, N-methylpyrrolidone. Such a process is described in U.S. Pat. No. 4,910,294 for example. EP 0737705 A shows an alternative method in that there the polymer is produced from a prepolymer having halogen end groups. It is in the very nature of this method of production that a relatively high proportion of halogen-containing (by)products are formed and largely remain in the polymer. In consequence, commercially available polyphenylene sulfide films contain a relatively high proportion of halogen quantitatively determinable by customary methods of analysis. Chlorine is generally the halogen concerned.

The halogen content of standard industrial PPS products is invariably above 600 ppm, generally even above 900 ppm. One ppm here corresponds to one milligram of halogen per kilogram of the analyzed PPS film material as used.

A connection between the halogen content of PPS films used in acoustic membranes and the properties of these membranes for the use as speakers has hitherto not been discussed.

The problem addressed by the invention was that of offering, for the manufacture of speaker membranes (acoustic membranes), film composite systems which, although inexpensive and therefore economically attractive, give rise to acoustic membranes that have improved acoustic properties as compared with commercially available PPS films. And this without sacrificing the membranes' good properties, i.e., their high flexural stiffness, their low density and also their high internal damping.

The problem is solved, surprisingly, by using a PPS having a total halogen content of not more than 550 ppm as the material for the outer films of such membranes. Measurements have shown that the THD of a speaker utilizing such a membrane was significantly less than that of a speaker utilizing a membrane whose outer layer consists of the usual commercial PPS. Such an effect was unforeseeable for a person skilled in the art.

The invention accordingly provides a multi-layer composite for use as or in a membrane for electroacoustic transducers, comprising at least one first and one second outer layer, optionally a damping layer disposed between these outer layers, wherein at least one of the outer layers ("the first outer layer") consists of a polyphenylene sulfide plastic, and wherein the halogen content of the polyphenylene sulfide plastic ("PPS plastic") does not exceed 550 ppm.

Further layers may optionally be disposed between the outer layers. The multi-layer composite may be a two-layer composite (of outer layers only), it may be a three-layer composite (especially outer layer/damping layer/outer layer), or it comprises more than three layers, in which case it is advantageous for a damping layer to be at least one of the layers between the outer layers. The at least one damping layer (in a composite comprising three or more layers) is in especially advantageous embodiments a layer of adhesive, especially a layer of pressure-sensitive adhesive.

The first outer layer is preferably from 1 to 50 μm in thickness and more preferably from 1 to 5 μm in thickness.

Suitable films for use as second outer layer include, for example, films of polyetheretherketone (PEEK), standard commercial polyphenylene sulfide (PPS), polyethylene naphthalate (PEN), polyethylene terephthalate (PET), polybutylene terephthalate (PBT), polyarylate (PAR), polyimide (PI), polyetherimide (PEI), polyphenyl sulfone (PPSU), polyether sulfone (PES), polysulfone (PSU) or thermoplastic polyurethane (TPU).

In particularly advantageous embodiments of the invention, however, the second outer layer is also made of low-halogen PPS, so both outer layers of the multi-layer composite consist of polyphenylene sulfide plastic whose halogen content does not exceed 550 ppm in either case.

The second outer layer is advantageous also from 1 to 50 μm in thickness, preferably from 1 to 5 μm in thickness.

In a particularly advantageous embodiment, both outer layers are made of the same low-halogen PPS plastic, and/or the two outer layers have the same thickness, meaning in particular that the multi-layer composite is symmetrical or at least symmetrical in respect of the outer layers.

In one version, the multi-layer composite of the invention consists of two laminated-together plastics films where at least one of the films—and optionally also both of the films—consists of polyphenylene sulfide plastic whose halogen content does not exceed 550 ppm. Two-film systems of this type are particularly useful for membranes when the two-layer composite has sufficiently damping properties even without additional damping layer and/or the damping requirements of the application are low.

It is especially advantageous when the two-layer composite is obtainable by softening and/or incipiently melting one of the films in order to improve its adherence to the other film. A film of thermoplastic polyurethane is especially advantageous for this. A particularly advantageous embodiment of a two-layer composite accordingly comprises a TPU film and a film of reduced halogen content PPS.

As noted at the beginning, the membrane should be efficiently damped in order to display a very smooth frequency response characteristic. It is therefore preferable for a damping layer, which may be single-layered or in turn multilayered in construction, to be disposed between the two outer layers of the multi-layer composite. A metric for the damping of the overall multilayered membrane construction is the mechanical loss factor (tangent delta; tan δ), defined as the ratio of loss modulus E" to storage modulus E': tan δ=E"/E'.

It is known that adhesives, especially pressure-sensitive adhesives, are capable of meeting the requirements expected of the damping layer and of ensuring high damping in the multi-layer composite. In a preferred embodiment, therefore, the damping layer comprises a single-layered or multilayered double-sided adhesive tape, especially pressure-sensitive adhesive tape; more particularly, the damping layer is formed by a single-layered or multilayered double-sided adhesive tape, especially pressure-sensitive adhesive tape. Such a pressure-sensitive adhesive tape, in addition to its damping effect, is capable, by virtue of its (self-)adhesive properties, to ensure the coherence of the layers in the composite.

In a preferred version, the damping layer itself is single-layered, so the multi-layer composite is a three-layer composite. The damping layer is then preferably a layer of pressure-sensitive adhesive. In a highly preferred manner, the multi-layer composite has a symmetrical three-layer construction of the outer layer/pressure-sensitive adhesive/outer layer type where the outer layers are identical in chemical composition and thickness.

The layer thickness of the (pressure-sensitive) adhesive layer in three-layer composites is advantageously in the range from 2 μm to 100 μm, preferably in the range from 5 μm to 50 μm and more preferably in the range from 10 μm to 30 μm.

A further version of the invention is represented by a—symmetrical or asymmetrical—five-layer construction wherein the outer layer has an inner supporting or stabilizing layer, consisting, for example, of a film of polyetheretherketone (PEEK), standard commercial polyphenylene sulfide (PPS), polyethylene naphthalate (PEN), polyethylene terephthalate (PET), polybutylene terephthalate (PBT), polyarylate (PAR), polyimide (PI), polyetherimide (PEI), polyphenyl sulfone (PPSU), polyether sulfone (PES), polysulfone (PSU) or thermoplastic polyurethane (TPU) or, more preferably, likewise formed of a film of a low-halogen polyphenylene sulfide (PPS) having a halogen content of less than 550 ppm. A layer of (pressure-sensitive) adhesive is provided in each case between this inner supporting/stabilizing layer and each outer layer. The two layers of (pressure-sensitive) adhesive are preferably chemically identical and/or equal in thickness. However, the layers of (pressure-sensitive) adhesive may also be selected to differ with regard to their chemical nature and/or their thickness.

The thickness of the inner supporting or stabilizing layer is preferably 1-50 μm, more preferably 1-30 μm and yet more preferably 1-5 μm.

The thicknesses of the layers of (pressure-sensitive) adhesive are preferably 1-100 μm, more preferably 1-50 μm and yet more preferably 2-40 μm independently of each other. Of particular preference here is the fully symmetrical five-layered composite construction having outer layers identical in chemical composition and thickness and layers of (pressure-sensitive) adhesive which are identical in chemical composition and thickness.

Pressure-sensitive adhesives (PSAs, which are also known as self-adhesives) are specifically those polymeric compositions which—perhaps through suitable additization with further components, such as tackifying resins for example—are endurably tacky and permanently adhesive at the application temperature (room temperature unless otherwise defined), adhering to a multiplicity of surfaces on contact, more particularly instantaneously, by virtue of their tackiness. They have the ability, even at the application temperature, and without being activated by a solvent or by heating, but typically under the influence of a certain pressure, to wet an adherend substrate sufficiently for interactions sufficient for adherence to develop between the adhesive and the substrate. Parameters influencing this process include said pressure and also the contact period. The special properties of pressure-sensitive adhesives are attributable inter alia specifically to their viscoelastic properties.

Acrylate PSAs are advantageously employed for the adhesive layers. Acrylate PSAs are adhesives whose base polymers are polymers derived from acrylic monomers—to be understood as meaning specifically acrylic and methacrylic acids, the esters of said acids and also the copolymerizable further derivatives of said acids—provided the acrylic monomers—plus optionally further, comonomer monomers—are used in the polymerization in an amount at least to substantially determine the properties of the adhesive as a result. It is thus possible, for example, to employ pressure-sensitive adhesives having, at the time of polymerization, an acrylic monomer fraction of not less than 50 wt %, of not less than 80 wt % or of 100 wt % (purely acrylate systems).

Other adhesives, especially pressure-sensitive adhesives, known to a person skilled in the art are likewise possible and useful for the purposes of the invention, specifically those which effect good adherence to PPS and also have good damping properties. It is thus possible for example to specifically also use silicone adhesives and/or polyurethane adhesives and/or rubber adhesives, in particular silicone PSAs, polyurethane PSAs and rubber PSAs respectively.

To produce the multi-layer construction, the pressure-sensitive adhesive is applied either directly to one of the two outer layers, in the desired thickness for the layer, using an application method familiar to a person skilled in the art, or indirectly by coating a temporary transfer medium such as siliconized paper or siliconized film, laminating with the first of the two film layers and removing the temporary transfer medium. The second of the two film layers may be sent directly to the pressure-sensitive side of the one-sidedly laminated composite. Laminating devices which effect continuous interbonding of the material webs between rubber cylinders, or between a steel cylinder and a rubber cylinder, using adjustable contact pressure are useful for achieving consistent intercomposite adherence and to avoid air inclusions.

The production of membranes for electroacoustic transducers, specifically speaker membranes, is for example effected by embossing or deep drawing a multi-layer composite of the invention to confer a specific three-dimensional shape on this composite. To this end, the multi-layer composite is for example heated in a thermoforming mold and pressed into the shape of the final membrane by employment of pressure and/or vacuum.

The multi-layer composites of the invention are very useful in a method for producing membranes for electroacoustic transducers wherein they are subjected to the process of multicavity thermoforming. In this method, the multi-layer laminate is placed on a heatable thermoforming mold, which contains depressions with the negative copy of the membrane to be molded. Then, the multi-layer laminate is heated, for example by IR radiation, and thereby softened and then pressed from above into the depressions using compressed air. Alternatively, the softened multi-layer laminate is also pressable into the molds using a punch made of silicone or foamed silicone.

Overall halogen contents of less than 400 ppm are realizable for the multilayered composites obtained according to the invention. A further advantage in addition to improving the acoustic properties is thus also that the speaker membrane obtainable therefrom will by virtue of the lower overall halogen content fall below the limits typically mandated in the electronics industry, its field of use.

EXAMPLES AND COMPARATIVE EXAMPLES

The concept of the invention will now be more particularly described with a number of examples and counterexamples without any intention to thereby limit the invention.

Initially, commercially available standard PPS films were analyzed for their halogen contents by an external laboratory. Chlorine was in each case ascertained as the halogen in question, other halogens not being detectable in significant amounts. The samples measured consistently had a chlorine content of more than 1000 ppm (1000 mg/kg).

The halogen content of a low-halogen PPS film was 532 ppm.

To prepare for THD determination, three-layer composites were produced from one at a time 4 μm thick PPS film, one at a time 10 μm acrylate or silicone damping layer (each standard PSA; respectively identical in Example 1 and Comparative Example 1 and also in Example 2 and Comparative Example 2) and one at a time 4 μm thick PPS film, while low-halogen PPS films were used for the examples of the invention and standard PPS films for comparative tests (see table 1).

These three-layer composites were thermoformed into rectangular membranes 15 mm in length and 11 mm in width, which were installed in microspeakers otherwise having the same construction. The THD curves were recorded using an R&S® UPV Audio Analyzer (Rohde & Schwarz) in the same way in each case, so the values are directly comparable with each other. The absolute value determined in any one THD measurement is immaterial for a relative comparison.

The resonance frequency of the two speakers is 450 Hz. The THD curves of the speakers fitted with the multi-layer composite membranes produced from low-halogen PPS film were across the full frequency range, not only for the composites with an acrylate damping layer but also for the composites with a silicone damping layer, at between 0.1 and 10 kHz below the THD curves of the speakers fitted with membranes fabricated from commercially customary PPS film. Table 1 reports by way of example THD values at frequencies below the resonance frequency.

TABLE 1

Results of THD determination.

|  |  | PPS film used (for both outer films) each 4 μm thick | Damping layer thickness 10 μm | Chlorine content of PPS film (mg/kg) | THD (100 Hz) | THD (200 Hz) | THD (300 Hz) | THD (400 Hz) |
|---|---|---|---|---|---|---|---|---|
| Comparative Example 1 | standard PPS film from Toray | acrylate | 1540 | 25% | 16% | 9% | 5% |
| Example 1 | low-halogen PPS film from Toray | acrylate | 532 | 14% | 10% | 5% | 3% |

TABLE 1-continued

Results of THD determination.

|  | PPS film used (for both outer films) each 4 μm thick | Damping layer thickness 10 μm | Chlorine content of PPS film (mg/kg) | THD (100 Hz) | THD (200 Hz) | THD (300 Hz) | THD (400 Hz) |
|---|---|---|---|---|---|---|---|
| Comparative Example 2 | standard PPS film from Toray | 4 μm PPS/10 μm silicone damping layer/4 μm PPS | 1540 | 21% | 15% | 10% | 4% |
| Example 2 | low-halogen PPS film from Toray | 4 μm PPS/10 μm silicone damping layer/4 μm PPS | 532 | 14% | 9% | 4% | 2% |

The experiments demonstrate that the problem addressed by the invention is solved according to the invention by substituting PPS films of reduced halogen content (<550 ppm) for standard PPS films in an acoustic membrane. An effect due to the halogen content of the PPS films used on the sound quality of speaker membranes obtained using such films would and could not have been expected by a person skilled in the art.

It transpires that the THD values of a membrane obtained using a PPS film of reduced halogen content which are determined below the resonance frequency are consistently lower than those of a comparative membrane (same thickness and shape, same speaker) obtained using commercially available standard PPS film.

The invention claimed is:

1. A multi-layer composite adapted as a membrane for electroacoustic transducers, the multi-layer composite comprising: comprises
    at least one first outer layer and at least one second outer layer, wherein the at least one first outer layer and the at least one second outer layer consist of a polyphenylene sulfide plastic having a halogen content that does not exceed 550 ppm; and
    a damping layer disposed between the at least one first outer layer and the at least one second outer layer, wherein the damping layer consists of an acrylate pressure-sensitive adhesive layer or a silicone pressure-sensitive adhesive layer,
    wherein the at least one first outer layer and the at least one second outer layer have a thickness from 1 to 50 μm.

2. The multi-layer composite according to claim 1, wherein the at least one first outer layer has a thickness from 1 to 5 μm.

3. The multi-layer composite according to claim 1, wherein both the at least one first outer layer and the at least one second outer layer have a thickness from 1 to 5 μm.

4. The multi-layer composite according to claim 1, wherein the composite has a three-layer construction of first outer layer/damping layer/second outer layer.

5. A speaker membrane comprising the multi-layer composite according to claim 1.

6. A method comprising:
    thermoforming the multi-layer composite according to claim 1 to produce a membrane adapted for an electroacoustic transducer.

7. The method according to claim 6, wherein the thermoforming comprises at least one selected from embossing and deep drawing the multi-layer composite.

8. The multi-layer composite according to claim 1, wherein the damping layer consists of the acrylate pressure-sensitive adhesive layer that is a purely acrylate system.

9. A two-film system adapted as a membrane for electroacoustic transducers, the system comprising
    a first outer film and a second outer film connected together, wherein at least one of the first film the second film consists a polyphenylene sulfide plastic having a halogen content that does not exceed 550 ppm,
    a damping layer disposed between the first outer film and the second outer film, wherein the damping layer is formed by, or comprises, a double-sided pressure-sensitive adhesive tape.

10. The multi-layer composite according to claim 1, wherein the damping layer consists of the silicone pressure-sensitive adhesive layer.

* * * * *